(12) United States Patent
Johnson et al.

(10) Patent No.: US 7,118,074 B1
(45) Date of Patent: Oct. 10, 2006

(54) ELECTRODYNAMIC TETHER

(75) Inventors: Charles L. Johnson, Madison, AL (US); Judy L. C. Ballance, Huntsville, AL (US); Kenneth J. Welzyn, Brownsboro, AL (US); Jason A. Vaughn, Madison, AL (US); Enrico Lorenzini, Wayland, MA (US); Peter S. Schuler, Westwood, MA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/690,161

(22) Filed: Oct. 17, 2003

(51) Int. Cl.
*B64G 1/00* (2006.01)

(52) U.S. Cl. .............................. 244/158 R; 244/158.2

(58) Field of Classification Search ............ 244/158 R, 244/158.1, 158.2
See application file for complete search history.

(56) References Cited

U.S. PATENT DOCUMENTS

| | | | |
|---|---|---|---|
| 4,083,520 A | | 4/1978 | Rupp et al. |
| 4,097,010 A | | 6/1978 | Colombo et al. |
| 4,824,051 A | * | 4/1989 | Engelking ............... 244/158 R |
| 4,923,151 A | * | 5/1990 | Roberts et al. .......... 244/158 R |
| 5,082,211 A | | 1/1992 | Werka |
| 5,163,641 A | | 11/1992 | Yasaka |
| 5,387,629 A | * | 2/1995 | McGrath et al. ............. 524/190 |
| 6,116,544 A | * | 9/2000 | Forward et al. ......... 244/158 R |
| 6,173,922 B1 | * | 1/2001 | Hoyt et al. .................. 244/172 |
| 6,362,574 B1 | * | 3/2002 | Aguero et al. ........... 315/169.3 |
| 6,386,484 B1 | * | 5/2002 | Hoyt et al. .................. 244/172 |
| 6,419,191 B1 | * | 7/2002 | Hoyt et al. ............. 244/158 R |
| 6,431,497 B1 | * | 8/2002 | Hoyt et al. .................. 244/172 |
| 6,459,206 B1 | * | 10/2002 | Aguero et al. ........... 315/111.81 |
| 6,732,978 B1 | * | 5/2004 | Ockels et al. ............... 244/172 |
| 6,755,377 B1 | * | 6/2004 | Levin et al. ............ 244/158 R |
| 6,758,443 B1 | * | 7/2004 | Levin et al. ............ 244/158 R |
| 2003/0213874 A1 | * | 11/2003 | Ockels et al. ............... 244/172 |

OTHER PUBLICATIONS www.dupont.com/kapton/general/elec-design.html, DuPont Kapton Technical Bulletin: Metallizing, pp. 1-6.*
Johnson, Charles L. et al., "Electrodynamic Tethers For Spacecraft Propulsion," AIAA 98-0983 36th Aerospace Sciences Meeting & Exhibit, American Institute of Aeronautics and Astronautics (Reston, VA), pp. 1-8, (Jan. 12, 1998).
Estes, Robert D. et al., "Technology of Bare Tether Current Collection," Tether Technology Interchange Meeting, NASA CP-1998-206900, NASA (Marshall Space Flight Center, AL), pp. 379-398, (1998).

* cited by examiner

*Primary Examiner*—Teri Pham Luu
*Assistant Examiner*—S. A Holzen
(74) *Attorney, Agent, or Firm*—James J. McGroary; Anthony P. Venturino (57) ABSTRACT

A tether system for providing thrust to or power subsystems of an artificial satellite in a low earth orbit. The tether has three main sections, an insulated section connected to the satellite, a conducting section connected to the insulating section for drawing in and releasing electrons from the space plasma and a non-conducting section for providing a tension to the other sections of the tether. An oxygen resistant coating is applied to the bare wire of the conducting section as well as the insulated wires of the insulated section that prevents breakdown during tether operations in the space plasma. The insulated and bare wire sections also surround a high tensile flexible polymer core to prevent any debris from breaking the tether during use.

7 Claims, 4 Drawing Sheets

ELECTRODYNAMIC TETHER

The invention described herein was made in performance of work under a NASA contract and by an employee of the United States Government and is subject to the provisions of Section 305 of the National Aeronautics and Space Act of 1958, as amended, Public Law 85-568 (72 Stat. 435; 42 U.S.C. §2457), and 35 U.S.C. §202, and may be manufactured and used by or for the Government of the United States of America for governmental purposes without the payment of any royalties thereon or therefor. In accordance with 35 U.S.C. §202, the Contractor elected not to retain title.

FIELD OF THE INVENTION

The principal utility of the present invention is in outer space, where it is useful for powering spacecraft subsystems, charging battery systems, raising the orbit of a satellite or lowering the orbit of a satellite. The satellite may be a manmade object, e.g., a spaceship or a telecommunications satellite or a space station, or a smaller celestial body orbiting a larger celestial body. Such operations are accomplished with the use of an electro-dynamic tether system.

BACKGROUND OF INVENTION

Various tests have verified the utility of electro-dynamic tethers in space such as the Small Expendable Deployer System (SEDS 1 & 2), the Plasma Motor Generator (PMG) and the Tethered Satellite System flights (TSS-1 & TSS-1R). Electro-dynamic tethers, in a relatively vertical gravity-stabilized manner, interact with the magnetic fields of the Earth's or other celestial bodies magnetic fields to produce either electrical power or thrust. These tethers generally consist of a wire extending from a satellite or connected between two satellites, each containing plasma contactors, which are orbiting the Earth or other celestial body. An electromotive force (emf) is induced across the length of the tether.

Figure 1:
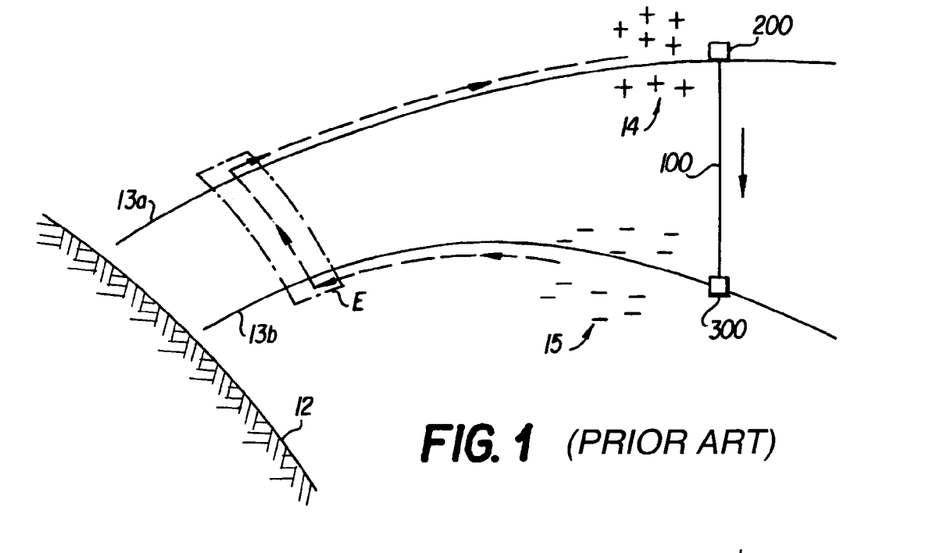
FIG. 1 is a diagram of the circuit created using a tether in orbit above the Earth.

The emf acts to create a potential difference across the tether by making one end of the tether positive with respect to the other end. In order to produce a current from this potential difference, the tether ends must make electrical contact with the Earth's plasma environment. Both plasma contactors and large conductive surfaces at the ends of the tether provide this contact, establishing a current loop through the tether, external plasma and the ionosphere around the Earth, sometime called a phantom loop. An example of the phantom loop is shown in FIG. 1. Two field lines 13a and 13b representing levels of the magnetic field of the Earth 12 are shown. As the tether 100 connects the field regions 13a and 13b of the Earth 12 in the orientation as shown, the electrons are moved towards the other end, near plasma contactor 300, of the tether, thus charging the ends of the tether, positive near a plasma contactor 200 and negative near plasma contactor 300. When these plasma contactors or conductive surfaces are placed on the ends of the tether, the electrons are free to travel into and out of the tether cable creating charged clouds. As shown in the figure, the collection of electrons from a positive end plasma contactor 200 and their emission from a negative end plasma contactor 300 creates a net positive cloud 14 at the positive end plasma contactor 200 and a negative cloud 15 at the negative end plasma contactor 300. The excess free charges migrate along the geomagnetic field lines intercepted by the tether ends until they reach the vicinity of a lower section of the ionosphere E where there are sufficient collisions with neutral particles to allow the charges to migrate across the field lines and complete the phantom circuit.

Once the current is established within the tether, the combination of the current running through the tether, the tether orbiting about the earth and the geomagnetic field of the Earth react together to create a force that acts on the tether. This force acts in a direction opposite to the movement of the tether across the magnetic field in orbit. An example of this type of electro-dynamic tether is shown in U.S. Pat. No. 6,116,544 (Forward et al.), incorporated herein by reference in its entirety. The tether consists of a wire attached to a spacecraft at one end and attached to an end mass at the other end. The tether is made of a braided aluminum or copper wire. The tether is used to slow the spacecraft down and reduce its orbit.

Another application of the tether is to generate power to either charge batteries on the spacecraft or power spacecraft subsystems. As outlined above, the orbit of the tether across the Earth's magnetic field induces a force on the electrons within the tether wire, which creates a charge separation and produces an electric potential due to Coulomb's law until the forces are balanced by current flow. When the current flow stops, there is a potential difference between one end of the tether and the other. After completing the circuit, the power provided may be used to power spacecraft substations or charge batteries. An example of such a system is shown in U.S. Pat. No. 4,923,151 (Roberts et al.), incorporated herein by reference in its entirety, with the use of a tether extended between two satellites. The tether comprises outer conductive material layers and an inner conductive material layer electrically connected to the tethered object, both separated by an insulator material.

Studies have shown that the use of a bare wire in space would substantially increase the collection of electrons as opposed to the use of conventional plasma contactors. However, a problem with bare wire plasma contactors is that in an oxygen rich environment of a low Earth orbit, the bare wire tethers of copper or aluminum would quickly oxidize and degrade, losing their electro-dynamic properties. Such greatly reduces the effective life of the tether and would require more frequent replacement. Secondly, the Earth's thermal albedo would raise the temperature of the bare wire tether to the point that its resistance would rise, thus decreasing its performance and reducing effective use of the tether.

Another problem with the prior art devices is that the wire constructions are not sufficiently flexible enough to allow a sufficient length of the tether to be wound up in a relative small space on the satellite or spacecraft orbiting a celestial body.

SUMMARY OF THE INVENTION

It is thus an object and intention of this invention to overcome these problems with the prior art devices and provide an electro-dynamic tether that can effectively increase or decrease the orbit of a satellite or power subsystems and charge batteries of a spacecraft. It is a further object to provide a tether that fits within the weight and volume constraints of the existing Small Expendable Deployer Systems (SEDS). The tether must also be strong enough to withstand the forces exerted by deployment and the tether dynamics and further to survive the space environment including atomic oxygen, temperatures and micrometeoroid/orbital debris (M/OD) to accomplish the mission duration of twenty-four hours to twenty-one days.

These and other objects are accomplished with the use of an electro-dynamic tether connected to a spacecraft or satellite comprising three sections spliced together, a non-conducting section extending away from the spacecraft, a conducting section attached to the non-conducting section and an insulating section connecting between the conducting section and the spacecraft. The non-conducting section is a flat, braided polyethylene fiber, the conducting section is a coated aluminum wire group and the insulating section is an insulated aluminum wire group. The insulating section attached to a unit within the spacecraft, which can be connected to craft subsystems, battery charges, and/or plasma contactors.

In a preferred embodiment, the length of the non-conducting section is preferably 10 km. Such length provides sufficient gravity-gradient tension to both deploy the conductive tether and to stabilize the entire system under action of electro-dynamic thrust force.

In another embodiment, the conducting section is coated with an atomic oxygen resistant conducting polymer, such as C-COR, made by Triton Systems, Inc. of Chelmsford, Mass. The conducting section of the tether collects electrons from the space plasma. The coating on the conducting section provides good surface conductivity for electron collection and improved surface optical properties for thermal control that prevents the aluminum wire from overheating.

In a further embodiment, each aluminum wire of the insulating section is over coated with a polyimide and an oxygen resistant, insulating polymer, such as TOR-BP, made by Triton Systems, Inc. of Chelmsford, Mass. The insulating section, which is closest to the spacecraft or satellite, prevents electron re-connection from the plasma contactor to the tether.

In another embodiment, the aluminum wires of the conducting and insulating sections are wrapped around a braided KEVLAR aramid fiber core. The aramid fiber core provides ample tensile strength as well as improved windability and deployability.

In a fifth embodiment, the aluminum wires in the conducting section and the insulating section are cold welded together. A cold weld provides strong bond between the wires while not damaging or oxidizing the aluminum.

BRIEF DESCRIPTION OF THE DRAWINGS

Other embodiments, features and advantages of the invention described herein will occur to those skilled in the art from the following description of a preferred embodiment and the accompanying drawings, in which.

DETAILED DESCRIPTION OF THE INVENTION

Figure 2:
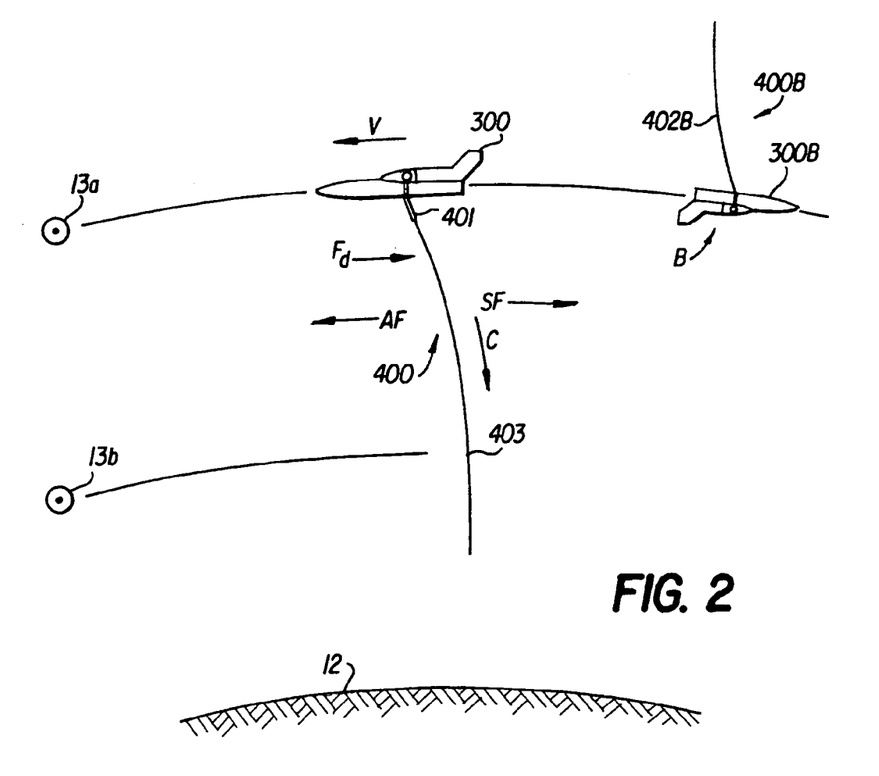
FIG. 2 is a perspective view of the tether system according to the preferred embodiment of the present invention.

The electro-dynamic tether 400 according to the present invention is shown in FIG. 2. In the figure, a spacecraft 300 is orbiting the Earth 12 in the direction and speed V. A tether 400 is extended down towards the surface of the Earth from spacecraft 300 in order to provide thrust to the spacecraft, power various subsystems or charge batteries. The tether is separated into three sections, an insulating section 401 attached to spacecraft 300, a conducting section 402 attached to the insulating section extending therefrom and a non-conducting 403 section attached to the conducting section and extending therefrom.

Circle dots 13a and 13b represent the magnetic field lines of the Earth moving out of the page (to the left of the direction of travel V). The horizontal lines extending from the field lines 13a and 13b represent the change in field strength. As is shown in FIG. 2, spacecraft 300 is at a different field strength than the extended portion of conducting section 402. As was discussed above with reference to FIG. 1, the magnetic field induces the electrons to move in the direction along path C towards Earth, i.e., to the lower end of tether 400, causing the upper end (away from Earth) of the tether to be more positive and the lower end (closer to Earth) of tether to be more negative. Conducting section 402 of tether 400 releases the electrons into space and a plasma contactor (not shown) located on spacecraft 300 draws in electrons, thus completing a circuit in a manner similar to the circuit described above with respect to FIG. 1.

As the spacecraft orbits the Earth in direction and speed V, the combination of the movement of tether 400 in orbit, current traveling throughout tether and the magnetic field of the Earth causes a force SF to act upon the electrons in the tether in the opposite direction from the direction V according to the equations:

$$\text{Force} = e * E \tag{1}$$

$$\text{where } E = (\text{velocity of tether}) \times (\text{magnetic field strength}) \tag{2}$$

$$\text{and } e = \text{the charge moving through the tether} \tag{3}$$

Force SF acting on the tether, in turn slows the orbit of the spacecraft as well. Thus, by extending the tether towards the Earth in an orbit, the tether in effect produces a reverse thrust to slow spacecraft 300 down and reduce its orbit.

Tether 400 may also be used to increase the velocity of the spacecraft and thus raise its orbit by reversing the flow of the electrons in the tether. As mentioned above, the natural flow of electrons along the tether is towards Earth 12. If a power supply is attached between the plasma contactor in the spacecraft and insulating section 401 and has a sufficient voltage to overcome the voltage supplied naturally in the tether, the electrons will travel in a reverse direction, namely the electrons will move up toward the spacecraft. Conducting section 402 will then collect electrons from the ionosphere and the plasma contactor will expel them from the spacecraft. Such arrangement effectively reverses the current in the tether, and according to equations (1), (2) and (3) above, will reverse the force acting on the tether, namely in the opposite direction of force SF and in the direction of force AF, shown in FIG. 2. Since the force AF acts on tether 400 in the same direction as V, the velocity of the tether will be increased, and thus the velocity of spacecraft 300 will increase as well.

The tether according to the present invention further may be used as a power generator on the spacecraft. In such an arrangement as shown in FIG. 2, a tether 400B is extended away from a spacecraft 300B and away from Earth, in a higher orbit. Spacecraft 300B is traveling in direction V. Based on the principles of the tether dynamics as described in reference to FIG. 1, the electrons will be collected by a conducting section 402B, move down through tether 400B, into spacecraft 300B. The orbital velocity in this apparatus creates a motional electric field that may be determined by equation (2) above. The motional electric field provides a voltage across tether 400B such that the current is collected by conducting section 402B and brought into spacecraft 300B for use by power systems and/or to charge battery systems.

Figure 3:
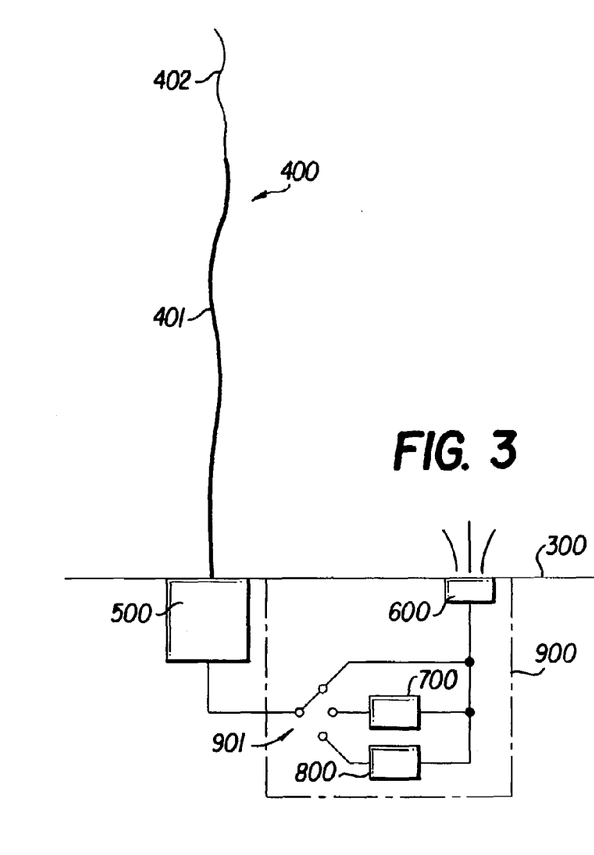
FIG. 3 is a diagram of the circuitry within a spacecraft having the tether of FIG. 2 attached thereto.

The circuitry located within spacecraft 300 used to perform each of these functions is illustrated in a basic form in FIG. 3. Depending on which function is being performed, i.e., reverse thrust, forward thrust and power generating, the electron flow will be coming in on or going out of tether 400. A connecting apparatus 500 is used to reel in and let out tether 400 from the spacecraft. The circuit generally has a switching section 900, which is used to complete the circuit with several systems.

If switching section 900 is connected as shown, the circuit is completed directly between tether 400 and a plasma contactor 600, which may be a hollow cathode, an electron gun, or other apparatus for bringing in electrons or emitting them. This circuit would be used to perform a reverse thrust to slow the spacecraft down.

If switching apparatus 900 connects the circuit across to a power supply 700 that is connected to plasma contactor 600, tether 400 would operate as a forward thruster. Namely, as outlined above, power supply 700 would provide a voltage along the circuit consisting of tether 400, power supply 700, plasma contactor 600 and the phantom loop that is stronger than the natural voltage occurring without the applied voltage. The electrons would be received by tether 400, brought through the power supply and emitted from plasma contactor 600.

If switching apparatus 900 connects across to a system substation 800 that is connected to plasma contactor 600, then tether 400 would operate as a power generator. The electrons would travel down tether 400 as outlined above with respect to the power generator into the system substation to run various devices within the spacecraft or to charge batteries.

Figure 4:
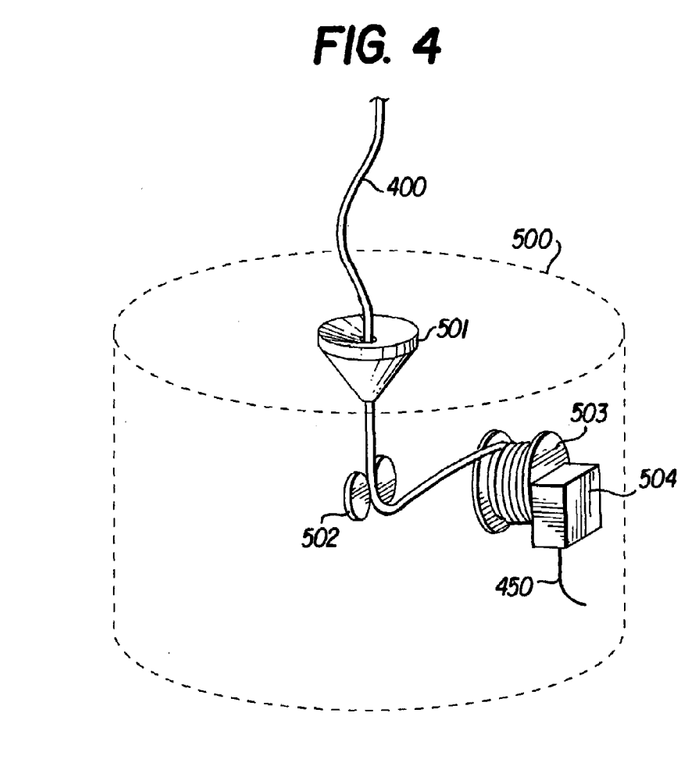
FIG. 4 is a perspective view of the connection apparatus between the tether of FIG. 2 and the spacecraft.

FIG. 4 illustrates a view of connecting apparatus 500. Tether 400 is extended from or drawn into connecting apparatus by operation of a spool 503. At the center of spool 503, tether 400 emerges at end 450 and is connected to the various devices as shown in FIG. 3. Tether 400 is guided out of the spacecraft via a system of rollers 502 and a tether guide 501. While a specific connecting apparatus is shown here, various other apparatus obvious to a person having ordinary skill in the art that is capable of drawing in and extending out the tether would work.

Figure 5:
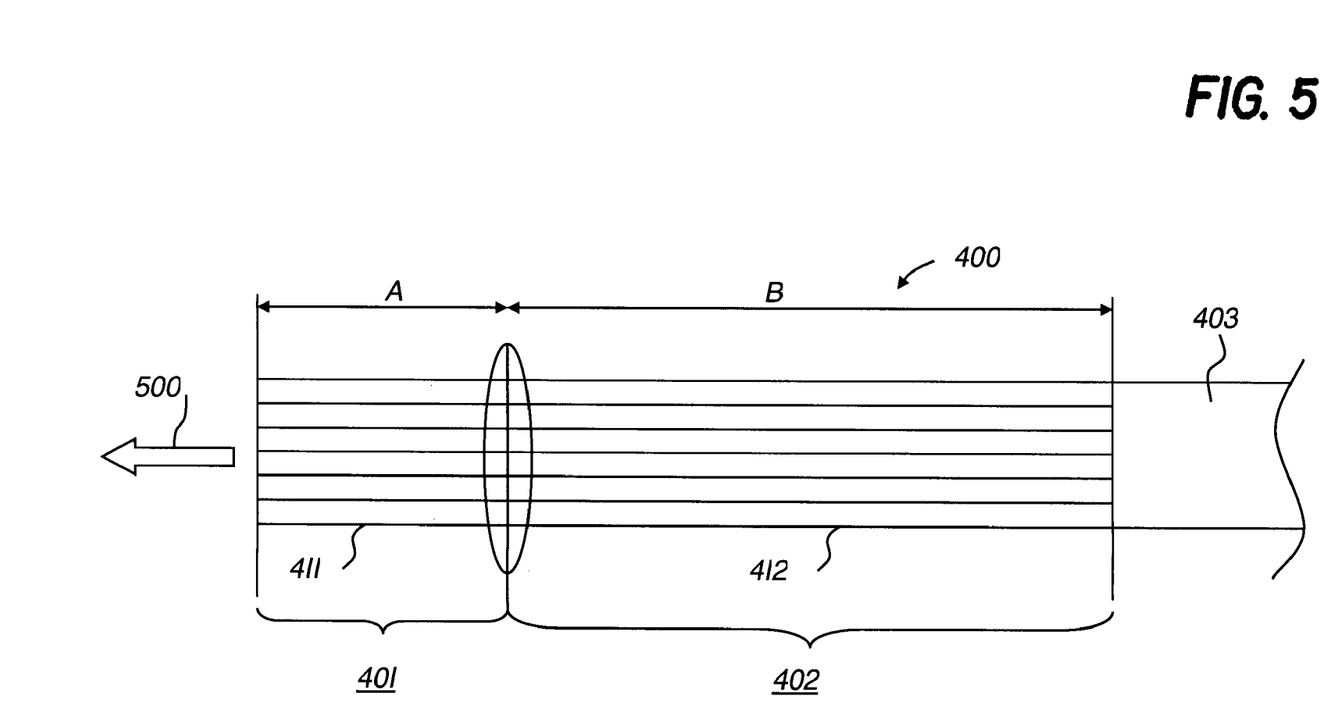
FIG. 5 is a blown up view of the tether according to the preferred embodiment of the present invention.
Figure 6A:
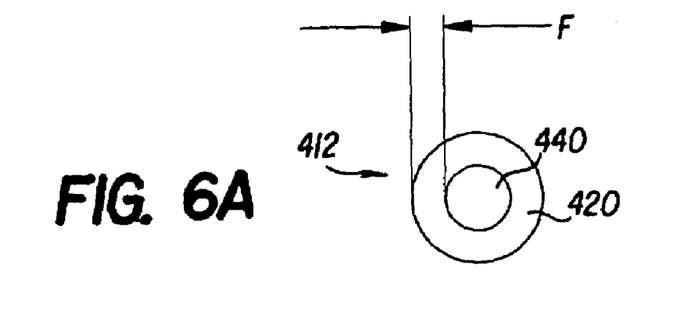
FIG. 6A is a cross section of the conducting section wire of the tether shown in FIG. 5.
Figure 6B:
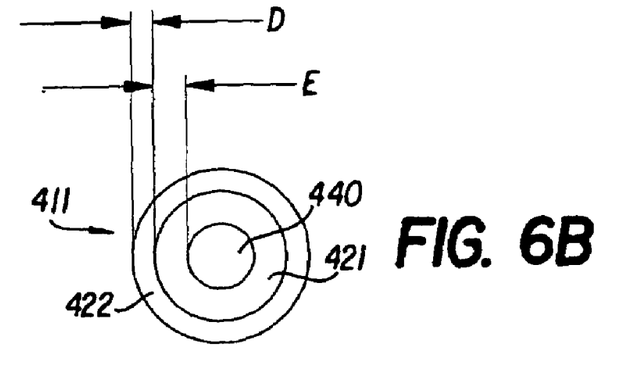
FIG. 6B is a cross section of the insulating section wire of the tether shown in FIG. 5.

The structure of tether 400 is shown with reference to FIGS. 5, 6A and 6B. Tether 400 generally comprises three sections as discusses above, a non-conducting section 403, a conducting section 402 and an insulating section 401. Non-conducting section 403 generally comprises a length of material, preferably 10 to 15 km, of flat, polyethylene fiber braid of 13×100 denier braided 7.5 to 8 picks per inch. An example of polyethylene fiber is Dyneema fiber, produced by Western Filament of Grand Junction, Colo. It is deployed first to provide sufficient gravity-gradient tension to both deploy the conductive tether and to stabilize the entire system under action of electro-dynamic thrust force. A mass may also be connected to the distal end of the tether from the spacecraft or used in place of non-conducting section to provide the required stability.

Conducting Section

Connected to non-conducting section 403 is the conducting section 402. This section either accepts electrons from the space plasma or emits them, depending on the particular use of tether 400. It generally comprises a length, which can range anywhere from 0.5 to 150 km in length. Preferable lengths are between 3 km and 10 km, with a preferred length of about 4.84 km, of aluminum wire, copper wire or alloys thereof. Use of either metal is dependent on weight constraints of the tether apparatus. In a preferred embodiment, conducting section 402 comprises seven wires 412 of aluminum wires, 28 American Wire Gauge 1350-0, braided together (shown parallel in FIG. 5 for illustration purposes). The braiding may occur in any fashion known to those having ordinary skill in the art that allows for the electrons to freely move along the tether while allowing the tether to be spooled for storage. For example, there may be no braiding, a cadacus type braiding or a braiding similar to that used in the Hoyt-tether (U.S. Pat. No. 6,116,544 (Forward et al.)). To provide conducting section 402 with a strong tensile strength and the ability to be spooled onto spool 503, the seven wire strands 412 are wrapped around a 6×380 braided high tensile but flexible polymer core, such as KEVLAR aramid fiber, produced by E. I. du Pont de Nemours and Company Corp. of Wilmington, Del.

The cross section of each wire 412 is shown in FIG. 6A. Each wire 412 comprises an aluminum wire 440 and is coated with a conductive and atomic oxygen resistant polymer coating 420 that may comprise one to three thin coatings. The conductive coating allows for electrons to freely pass through the coating. A preferable thickness F of coating 420 is between 0.34 mil and 0.36 mil, but other thicknesses are possible depending on the thickness of the aluminum wire and the particular application. Typical thickness of conductive sections is 0.3 mil to 0.4 mil. Preferably, thickness F is 0.35 mil.

For conducting section 402, coating 420 is a polyarlene ether resin that makes the polymer coating colorless mixed along with a conductive polymer which will additionally make the conducting section highly conductive to allow electrons to enter and exit the conducting section.

The conductive polymer may be any polymer having the property of being conductive. Typical conductors are polyaniline, polythiophene, polypyrrole and polyacetlene. Polyaniline is used in the preferred embodiment. The polyaniline is rendered conductive by doping the emeraldine base which is insulating with an acid, "HA," to create a emeraldine salt which is conducting. The conducting polyaniline may be made insulating again by undoping the emeraldine salt with ammonium hydroxide. The formulas can be written as follows.

Preferably, a combination of 13% polyanilene and 87% polyarlene ether resin is used as the coating 420 for conducting section 402 of tether 400. Such combination and thickness provides good surface conductivity for electron collection and improved surface optical properties for thermal control that prevents the aluminum wire from overheating. Coating 420 also provides an atomic oxygen resistant coating which prevents the aluminum wires from corroding, thus increasing the efficiency and usability of the wires. The basis for this atomic resistance is discussed below under the heading for Oxygen Resistant Phosphine Co-polymers.

Insulating Section

Connected between conducting section 402 of tether 400 and spacecraft 300, 300B is insulating section 401. It provides a passage of the electrons along the tether, without releasing them into the space plasma near the spacecraft and also prevents reconnection of the electrons from plasma contactor 600 in the spacecraft back into the tether (See FIG. 3), which could interfere with the tether electrical circuit as described above with reference to FIGS. 1 and 2. It generally comprises a length, typically from 0.0 m in some applications where no insulating section is needed to a length of 1 km in others to avoid reconnection as outlined above. In a preferred embodiment, the length is about 214 m of aluminum or copper wire. Use of either metal is dependent on weight constraints of the tether apparatus. In the preferred embodiment, the section comprises seven wires 411 of aluminum braided together (shown parallel in FIG. 5 for illustration purposes). The braiding occurs similar to that described above with reference to conducting section 402. For consistency between sections, the number of wires and the braiding of insulating section 401 should be similar or the same as conducting section 402. To provide insulating section 401 with a strong tensile strength and the ability to be spooled onto spool 503, the seven wire strands are wrapped around a 9×380 braided high tensile but flexible polymer core, such as KEVLAR aramid fiber, similar to the core of conducting section 402.

The cross section of each wire 411 in insulating section 401 is shown in FIG. 6B. Wire 411 comprises an aluminum wire 440 and is coated with a combination of an insulating polymer and an atomic oxygen resistant polymer. A single layer of a polymer having these properties can be used. In the preferred embodiment of the invention as shown in FIG. 6B, the coating consists of a first insulating layer 421 surrounding the wire and an oxygen resistant layer 422 surrounding insulating layer 421. The insulating polymer making up insulating layer 421 is preferably a polyimide. Insulating layer 421 preferably has a thickness E of 1.0 mil.

The oxygen resistant layer preferably comprises a polyarlene ether benzimidazole with biphenyl moieties and typically has a thickness of F of between 0.3 and 1.41 mil, but preferably has a thickness F of between 0.3 and 0.4 mil. In the preferred embodiment, the thickness is 0.35 mil. However, larger or smaller thickness may be used depending on the intended use and specific parameters of the tether. The basis for this atomic resistance is discussed below under the heading for Oxygen Resistant Phosphine Co-polymers

The layer of polyimide in insulating layer 421 provides a superior insulation with high heat resistant capabilities. In the preferred embodiment, the thickness should be such as to provide a dielectric breakdown voltage of between 5000 and 6000V, based on the electric wire structure outlined above, while being able to withstand temperatures of −98 to 88° C.

Insulating section 401 and conducting section 402 are preferably connected together via a cold weld between each wire in the sections, preformed in a manner known to those skilled in the art, such as high pressure, forced contact or electric current cold welding. The cold weld provides a strong joint between these tether sections without affecting their electrical properties. The insulating polymer and oxygen resistant layer of insulating section 401 may overlap the connection to protect the connection.

Oxygen Resistant Phosphine Co-Polymers

In the low Earth orbit, atomic oxygen are heavily present, which would quickly cause the copper or aluminum wire strands to oxidize if the wires were left bare, without any coating. Following this oxidation, the electrodynamics of the copper and aluminum wires decreases substantially.

In the oxygen resistant layers, 420 and 422, in conducting section 402 and insulating section 401, respectively, the polyarlene ether (COR) and the polyarlene ether benzimidazole with biphenyl moieties (TOR-BP) each have phenylphosphine oxide groups in their backbone make-up of the polymer, which gives them the property of being oxygen resistant (see formulas below). The use of

6F

BP

Polyarlene ether (COR)

-continued

Polyarelene ether benzimidazole (TOR-BP)
w/biphenyl groups these phenyl-phosphine oxide groups in the coating for the tether in the low Earth orbit oxygen rich environment causes a layer of phosphate to form on the outer surface of the coating upon exposure to the plasma. The phosphate layer created will protect against attack by the atomic oxygen, protecting the wire from further erosion. Suitable ranges for these phenyl-phosphine moieties is greater than or equal to 75% molar ratio.

While these phosphines polymers were used in this example, other phosphine polymers could be used that have similar properties as outlined above. For example, rather than using a polyarlene ether benzimidazole having biphenyl moieties as outlined above, the co-polymer may be a polyarlene ether benzimidazole with no biphenyl moieties having the following formula.

TOR (PAEBI) Polymer

Where Ar is and/or

An example of a copolymer having the above formula is a product sold under the trade name TOR, by Triton Systems, Inc. of Chelmsford, Mass.

Although the present invention has been described and illustrated in detail to a specific tether design and structure, such explanation is to be clearly understood that the same is by way of illustration and example only, and is not to be taken by way of limitation. Other modifications of the above examples may be made by those having ordinary skill in the art which remain within the scope of the invention. For instance, other coatings other than those presented here can be used as long as those coating provide similar properties. Further varying lengths and width of the tether and the wires in the tether are disclosed herein; however, such lengths can be extended or shortened depending on the use and intention of the tether system. More or fewer wire strands can also be used according to this invention. Further, other coatings on the wire may be introduced in lieu of or in addition to those described herein provided they provide similar functional characteristics or have similar properties as those polymers disclosed herein. However, various other structures are possible using the invention, such as a tether with an end mass rather than the non-conducting section, or differing materials used in the non-conducting section. It should be apparent from this description that embodiments other than those described above come within the spirit and scope of the present invention. Thus, the spirit and scope of the present invention should be defined only by the terms of the claims.

We claim:

1. A tether system, for a satellite, comprising:
a plasma contactor mounted on the satellite for accepting or emitting electrons;
a insulated section of wire electrically connected to the plasma contactor;
a bare wire section electrically connected to the insulated section capable of accepting or emitting electrons; and
a third section connected to the bare wire section,
wherein each of the insulated and bare wire sections is coated with an atomic oxygen resistant polymer, the atomic oxygen resistant polymer is a phosphine copolymer, and the phosphine copolymer coating on the bare wire is combined with a conductive material to make the coating conductive wherein the sections are separate and distinct and are connected in series.

2. The tether system according to claim 1, wherein the conductive material is one of polyanilene, polythiophene, polypyrrole and polyacetlene.

3. The tether system according to claim 1, wherein the phosphine polymer coating on the bare wire comprises 87% phosphine copolymer and 13% conducting polymer.

4. The tether system according to claim 1, wherein satellite sub-systems are electrically connected between the insulated section and the plasma contactor.

5. The tether system according to claim 1, wherein the third section comprises a non-conducting polymer strand extending from the satellite.

6. The tether system according to claim 5, wherein the polymer strand is a flat braid of polyethylene fiber.

7. A tether system, for a satellite, comprising:

a plasma contactor mounted on the satellite for accepting or emitting electrons;

a insulated section of wire electrically connected to the plasma contactor;

a bare wire section electrically connected to the insulated section capable of accepting or emitting electrons; and a third section connected to the bare wire section, wherein the atomic oxygen resistant polymer is a phosphine polymer, and the phosphine polymer coating on the bare wire is a polyarlene ether resin wherin the sections are separate and distinct and are connected in series.

* * * * *